United States Patent [19]
Michel et al.

[11] Patent Number: 5,867,357
[45] Date of Patent: Feb. 2, 1999

[54] DYNAMIC PROTECTION CIRCUIT FOR A MOTOR TYPE LOAD

[75] Inventors: Ignacio Michel, Schaumburg; Bogdan Baurceanu, Chicago, both of Ill.

[73] Assignee: Eaton Corporation, Cleveland, Ohio

[21] Appl. No.: 878,698

[22] Filed: Jun. 19, 1997

[51] Int. Cl.[6] .................................................. H02H 5/04
[52] U.S. Cl. .............................. 361/31; 361/29; 361/110; 318/455
[58] Field of Search .......................... 361/28–31, 93–94, 361/98–99, 110, 79, 87, 187; 307/10.1, 10.7, 131; 364/483; 318/455, 466, 469, 264–267, 286

[56] References Cited

U.S. PATENT DOCUMENTS

| | | | |
|---|---|---|---|
| 3,733,532 | 5/1973 | Hill | 318/266 |
| 5,399,950 | 3/1995 | Lu et al. | 318/565 |
| 5,483,135 | 1/1996 | Parks | 318/469 |
| 5,539,290 | 7/1996 | Lu et al. | 318/565 |

*Primary Examiner*—Jeffrey A. Gaffin
*Assistant Examiner*—Michael J. Sherry
*Attorney, Agent, or Firm*—Fay, Sharpe, Beall, Fagan, Minnich & McKee

[57] ABSTRACT

An express down vehicle window lift motor drive system in which an overcurrent detection circuit (10) interrupts the flow of electrical power to the lift motor when the motor current exceeds a threshold which is set dynamically as a function of motor in-rush or peak current. Motor current is measured as a small voltage drop across a current shunt. When the current level rises above the dynamically set threshold energization of the motor is halted.

14 Claims, 4 Drawing Sheets

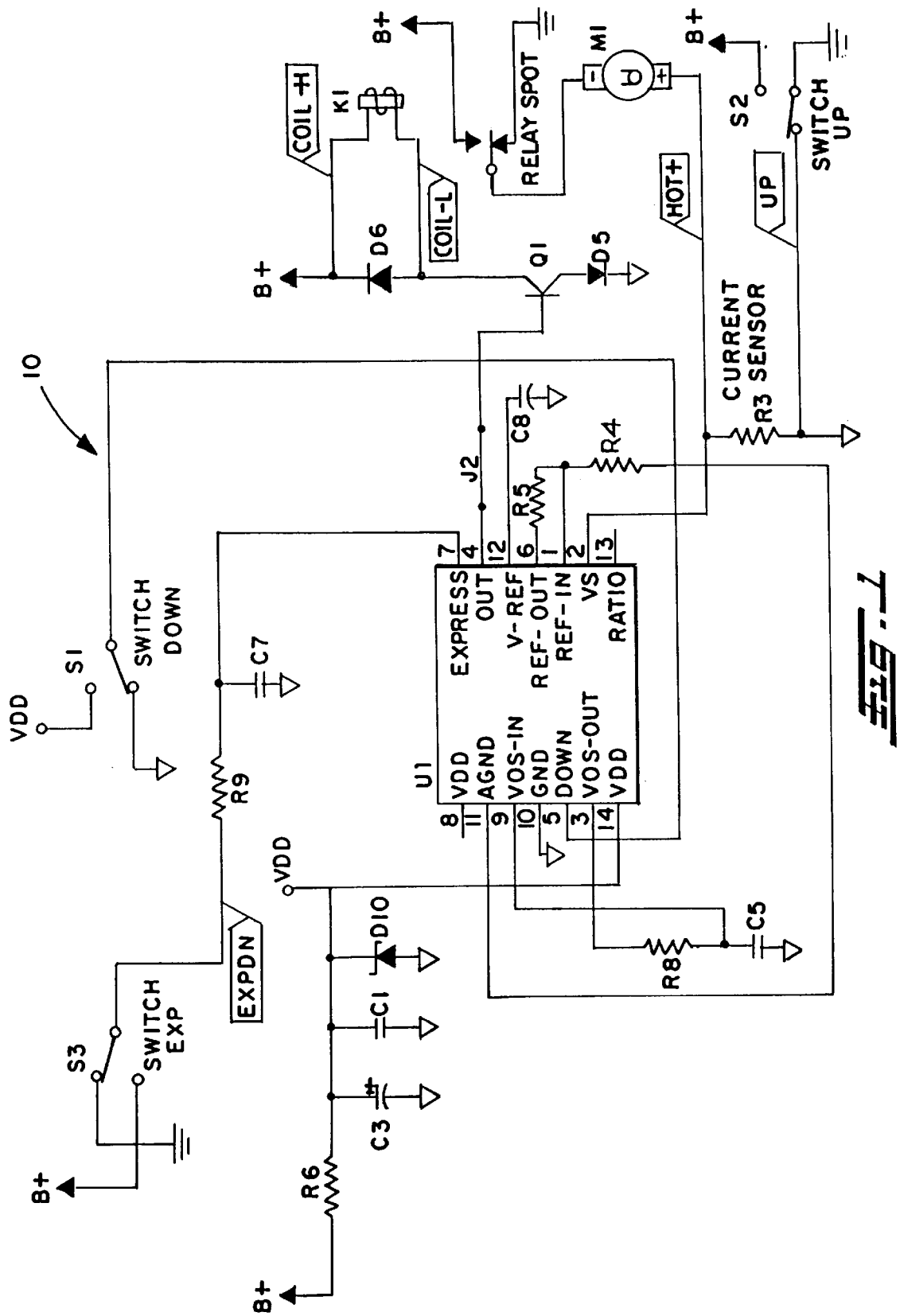

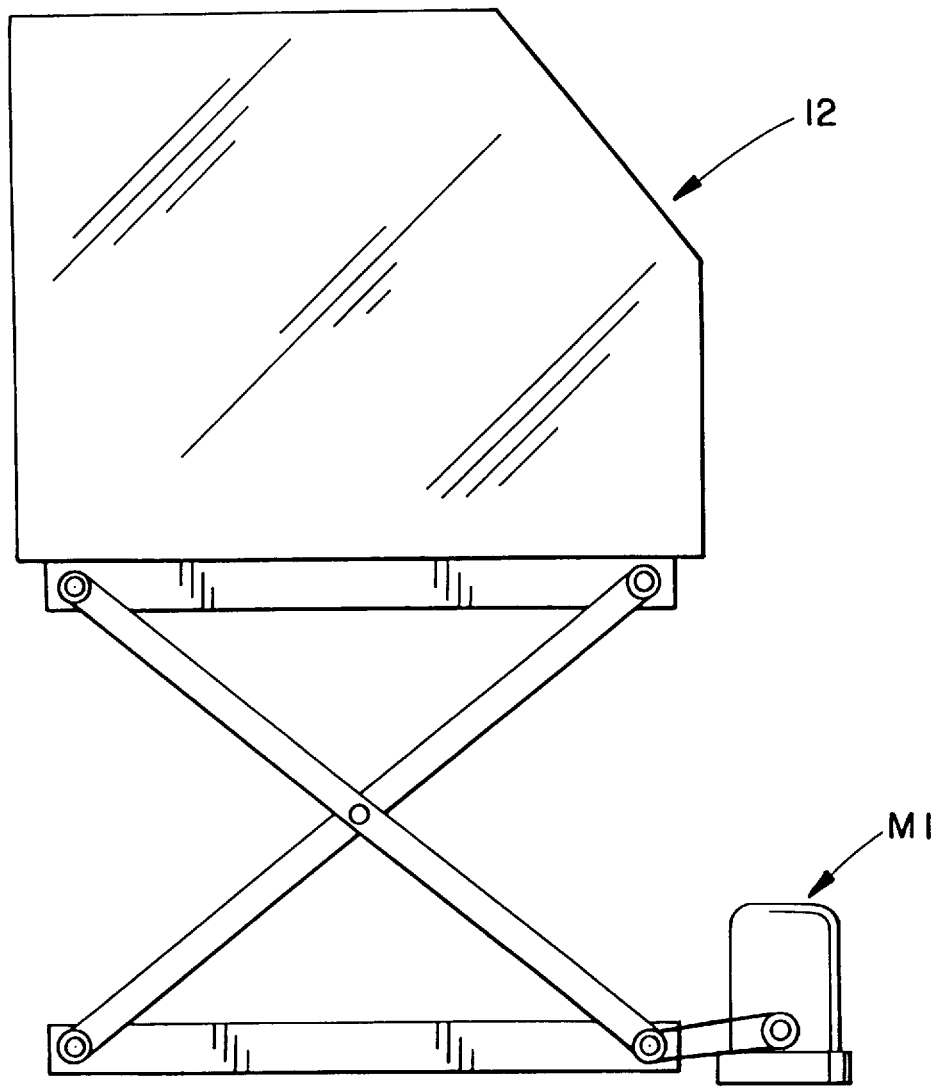
FIG. IA

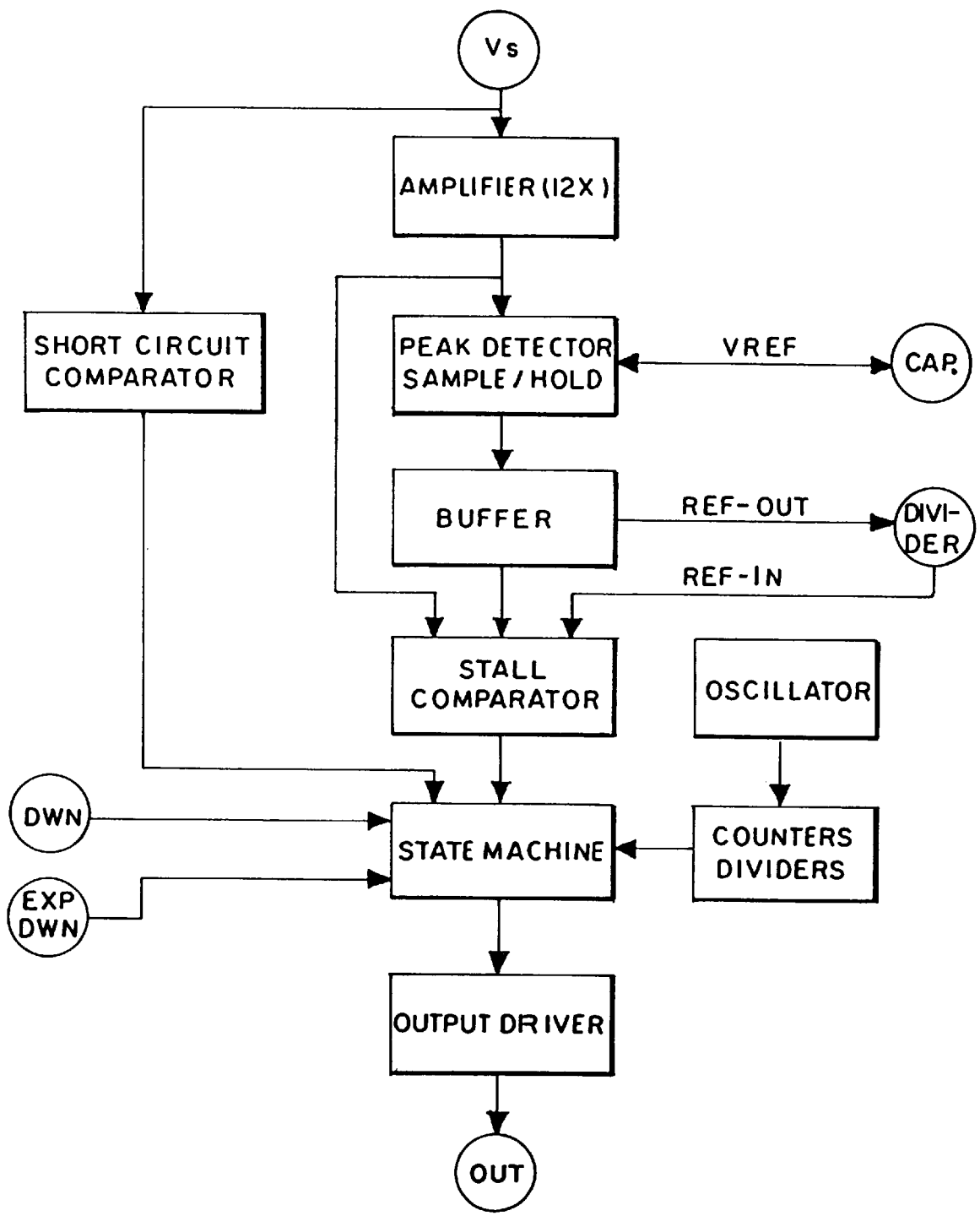

DYNAMIC PROTECTION CIRCUIT FOR A MOTOR TYPE LOAD

BACKGROUND OF THE INVENTION

The present invention relates generally to a vehicle power window lift motor control system and, more particularly, to a circuit for protecting the motor and its drive circuitry from damage due to overcurrent when the motor is stalled.

Vehicle power window lift motor systems are used to move vehicle windows up and down between two positions or to some point therebetween. Generally, the window continues to move in the designated direction so long as the actuating switch is held. The addition of an "express down" feature to many modern vehicle power window circuits additionally provides continuous window movement in the down direction without requiring more than a quick depression of an "express down" switch or a further depression of the down switch. When the circuit is in the express down mode, window movement continues until either an "up" or "down" switch is actuated, or until an end of travel limit is sensed.

To protect the window lift motor and its drive circuitry from overheating during potentially damaging prolonged motor stall conditions, such as when an end of travel limit has been reached, these systems usually include an overcurrent detection system for interrupting the flow of electric current to the motor whenever the motor current rises above a predetermined threshold or reference current level. The reference level is typically selected empirically taking into consideration the current and/or power capacity of the motor and its drive circuitry. However, it is oftentimes difficult to select a single fixed threshold which is effective over all operating temperature ranges and in the presence of varying circuit conditions.

BRIEF SUMMARY OF THE INVENTION

Accordingly, it is an object of the present invention to provide an express down vehicle window lift motor drive system having an improved end of travel limit sensing capability. The circuit monitors the current through the window motor, measured as a small voltage drop across a current shunt. An overcurrent detection circuit interrupts motor energization when the motor current exceeds a threshold which is set dynamically, based upon a percentage of the motor in-rush current. This in-rush current refers to a momentary current peak which occurs shortly after power is first applied to the motor. Thereafter, the current level generally drops until an end of travel position of the window causes the motor to stall. The motor stall results in a sharp rise in motor current, usually exceeding the level at in-rush. When the motor current exceeds the selected threshold, a stall condition is presumed and the motor is turned off.

Since the initiation of downward window movement can occur in hot or cold weather, with the vehicle engine running or turned off, basing detection of motor stall on the in-rush current level achieved under the same operating conditions allows varying circuit and environmental conditions to be taken into consideration in order to more accurately determine that an end of travel position has been reached. This and other features and advantages of the present invention will become readily apparent upon review of the following description taken in conjunction with the accompanying drawings.

BRIEF DESCRIPTION OF THE DRAWINGS

FIG. 1 is a schematic diagram illustrating the express down window lift motor control circuit of the present invention.

FIG. 1A is a diagram of the motor element engaging a window.

FIG. 3 is a block diagram illustrating the functional interaction of the various components of the circuits shown in FIGS. 1 and 2.

DETAILED DESCRIPTION OF THE INVENTION

Figure 2:
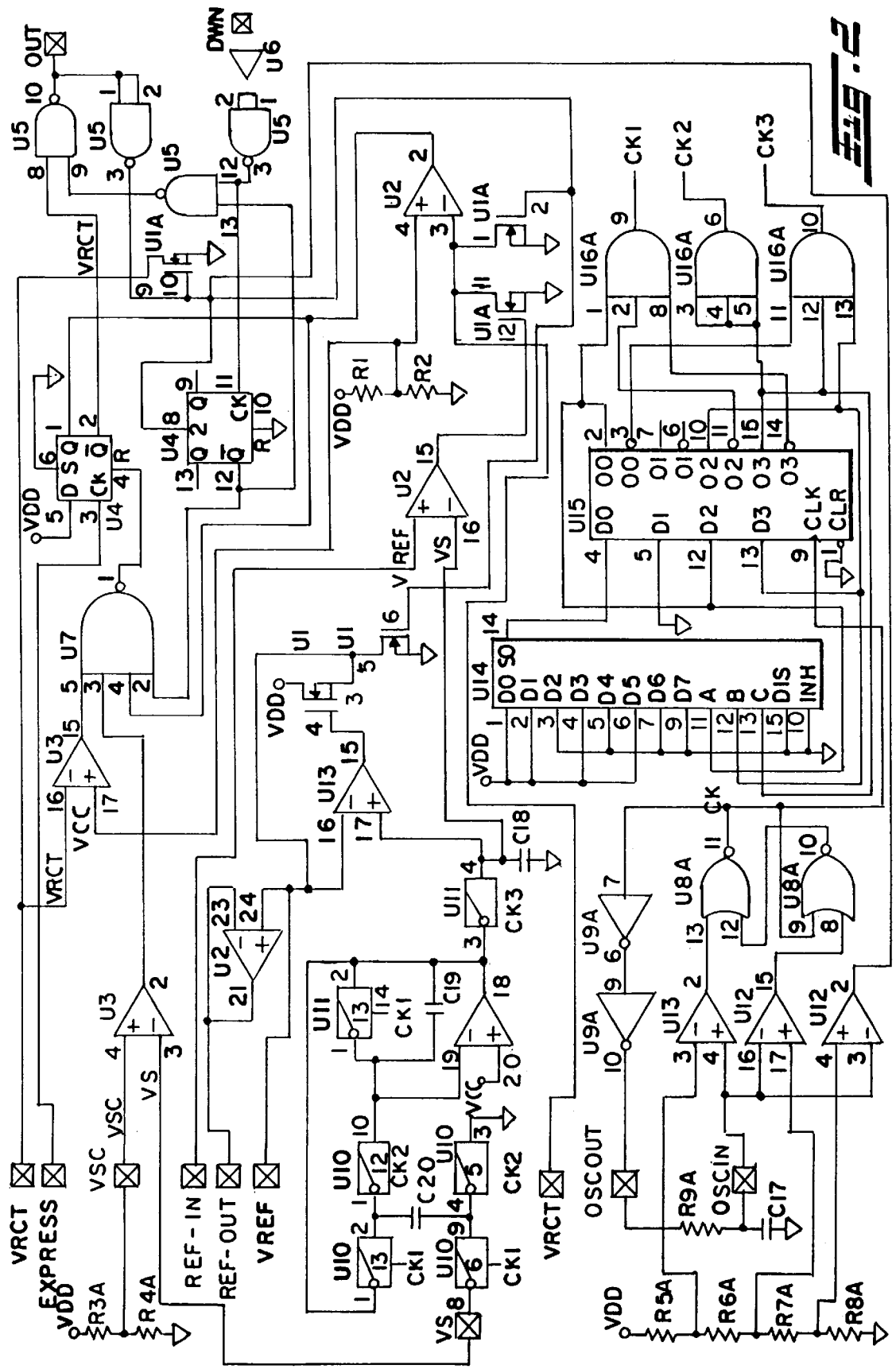
FIG. 2 is a schematic diagram detailing the circuitry of the application specific integrated circuit (ASIC) employed by the control circuit of FIG. 1.

Turning now to the drawings, and in particular to FIG. 1, the window motor control circuit of the present invention is indicated generally at 10. Circuit 10 is configured around and includes an ASIC $\mu 1$ processor, shown in greater detail in FIG. 2 described hereinbelow. ASIC $\mu 1$ is powered at pin $V_{DD}$ from the vehicle battery B+ with 9 to 16 volts through resistor R6. Pin $V_{DD}$ of ASIC $\mu 1$ and resistor R6 are connected to ground through capacitors C1 and C3, and through diode D10, all connected in parallel to provide a regulated $V_{DD}$ voltage of 5 Vdc.

An oscillator output pin $V_{OS-OUT}$ is connected through resistor R8 to an oscillator input pin $V_{OS-IN}$, used to generate a clock frequency, and to ground through capacitor C5. Pins REF-OUT (through resistor R5) and REF-IN are connected through resistor R4 to pin AGND. As described in greater detail below, a percentage of a stall reference voltage is applied to ASIC $\mu 1$ through pin REF-IN and pin REF-OUT is used to apply a stored voltage corresponding to the in-rush current to a voltage divider. Pin AGND provides an analog reference output, in the presently preferred embodiment ¼ $V_{DD}$.

Switch S1 is closed in response to movement by a passenger or driver of the vehicle of an actuator to effect downward movement of a vehicle window and is electrically connected between $V_{DD}$ and down input pin DOWN. In the exemplary embodiment of the present invention described herein, actuation of the connected actuator triggers the circuit into both "down" and "express down" modes. When depressed to a first detented position, a down mode is effected wherein the window moves down until the operator releases the actuator. Effecting depression of the actuator to a second detented position causes a switch S3 to close, thereby causing the system to enter the express down mode wherein downward movement of the window continues until an end of travel is reached or the mode is canceled by the user.

If the actuator is depressed a second time after the express down mode has already been initiated, the express down mode is cancelled. The depression of the "up" switch also cancels the express down mode. Thus, even though switch S3 may be mechanically controlled with switch S1 via a single button, it is electrically separate. Switch S3 is electrically connected between the vehicle battery, through resistor R9, and ground via capacitor C7, and to an express down input pin EXPRESS of ASIC $\mu 1$. However, one of skill in the art should readily appreciate that the present circuit will effectively operate in accordance with various other actuation schemes such as the provision of a separate express down actuator.

Pin V-REF of $\mu 1$ is grounded through capacitor C8 which is charged with the voltage corresponding to motor in-rush current. Shunt voltage input $V_S$ received from window lift motor M1, connected to the vehicle battery through a relay SPDT which is operated by a coil K1. When the motor M1 is running, this shunt voltage is used by ASIC $\mu 1$ to determine its state, i.e. in-rush, run or stall. Pin $V_S$ is also coupled through resistor R3 to switch S2 which is actuable to initiate upward movement of the vehicle window. In this regard, resistor R3 acts as a current sensor as long as up switch S2 is not closed.

Output pin OUT provides an output drive current to a transistor Q1 having its emitter connected through diode D5 to ground and its collector to the vehicle battery through diode D6. Diode D6 is connected on the opposite side to coil K1. Pin OUT is high whenever circuit 10 is in either the down or express down mode but is otherwise low.

Under normal conditions, ASIC $\mu$1 is powered by the vehicle battery and is in a latent condition, waiting for input on either of the DOWN or EXPRESS pins. These inputs are normally tied to ground via a 30k ohm resistor. Pin OUT is low at this time, thereby maintaining transistor Q1 in a cutoff state. Input $V_S$, referenced to ground, is at zero volts. When a user actuates the down switch S1, connecting pin DOWN to $V_{DD}$, the voltage at pin DOWN will go above a predetermined trigger voltage $V_H$ set to indicate positive actuation of the down actuator. If this condition is maintained for at least 10 ms, ASIC $\mu$1 considers it a valid signal confirming actuation of the down actuator.

If, at this time, pin OUT is low, indicating no prior actuation of down switch S1, pin OUT will go to a high state, thereby driving transistor Q1 with 5 mA to saturate the transistor and energize power relay SPDT via coil K1. Pin OUT remains high until the down actuator switch S1 is released, regardless of the amount of current flowing through motor M1. When the voltage at pin DOWN drops below the trigger voltage low $V_L$ for at least 10 ms, typically indicative of the release of down switch S1, pin OUT returns to a low state and ASIC $\mu$1 goes back to its wait state. If pin OUT is already in a high state when the DOWN pin is made high, pin OUT will be pulled low. This will cancel the express down function. Pin OUT will remain at a low state even though pin DOWN is high. Once pin DOWN goes low, ASIC $\mu$1 will be reset and made ready for a manual down operation.

To effect an express down movement of the window, ASIC $\mu$1 must be in a wait state and the operator must first actuate the down actuator thereby closing switch S1, forcing the voltage at pin DOWN above the trigger voltage high $V_H$. If pin OUT is low, it will go to a high state and power up the motor through relay SPDT. Input pin $V_S$ will read and amplify (by about 12 times in this exemplary embodiment) the voltage drop across the external current shunt (typically 28 to 120 mVdc). When motor M1 is initially turned on, the in-rush current causes a voltage spike on input pin $V_S$. The spike voltage value is amplified and stored by a Peak-Detect, Sample/Hold circuit and used as a reference on pin REF-IN.

In the Sample/Hold operation pin V-REF will charge an external capacitor C8 to a peak voltage charge during in-rush motor current. This peak voltage is a direct measurement of the in-rush current spike on pin $V_S$, which is amplified about 12 times. The peak voltage will be stored at pin V-REF until pin OUT goes low. This can take up to 13 seconds. Pin REF-OUT is a buffered output of pin V-REF, and an external voltage divider, formed by resistors R4 and R5, will divide this voltage and connect it to pin REF-IN. This REF-IN voltage is the threshold voltage used for detecting stall current on input pin $V_S$. In this exemplary embodiment, the threshold is set as a fixed percentage of the voltage corresponding to the in-rush current, preferably equating to about 87% of in-rush current. However, it should be apparent that any other similar means of selecting a threshold based upon in-rush current could alternately be used.

When the operator actuates express down switch S3, after the input on pin DOWN has gone above $V_H$ and pin OUT has gone to a high state, input pin EXPRESS will go to a high level, $V_H$. If this state is maintained for at least 10 ms, ASIC $\mu$1 latches internally so that pin OUT remains high even though pins EXPRESS and DOWN are low (i.e. the operator has released the express and down actuators). Pin OUT will remain at a high level even though either of pins EXPRESS or DOWN remain high. An internal oscillator in $\mu$1 will be incrementing internal counters during the entire time that ASIC $\mu$1 has been actuated into the express down mode.

Once circuit 10 is put into the express down mode, there are six modes of cancellation, the first being for time-out. When ASIC $\mu$1 is in the express down mode, pin OUT remains high. During this time, the oscillator on pins VOS-OUT and VOS-IN will increment internal time-out counters. If these counters complete a specified counting sequence, approximately 10 seconds with an oscillator frequency of 10 kHz, ASIC pin OUT will be pulled to a high state. This time-out ensures that down window notion is stopped after a certain period time thus protecting the motor against a prolonged stall condition in the unlikely event that the stall current doesn't exceed the threshold for some reason or some other circuit or mechanical anomaly has occurred.

The second cancellation of the express down mode occurs in the case of motor tall, usually occurring at an end of travel position of the window. If the voltage level at in $V_S$ is higher than the reference voltage at pin REF-IN, ASIC $\mu$1 will detect a stall condition and begin incrementing internal stall delay counters. If this stall condition is maintained for more than a predefined stall delay period, approximately 0.5 seconds in this presently preferred embodiment, but then $V_S$ goes back to a lower value, ASIC $\mu$1 resets the stall delay counters. If this latest peak value is higher than the in-rush, it will be stored by the peak detector and used for the new threshold. The ratio between the stall and time-out time periods can be modified. By pulling pin RATIO high, the ratio between the stall time period ($T_{stall}$) and the time-out period ($T_{tout}$), $T_{stall}/T_{tout}=0.35/10$; by pulling pin RATIO low, $T_{stall}/T_{tout}=0.65/10$. In the presently preferred embodiment of the present invention, wherein the pin is left floating, this ratio is 0.5/10 .

The express down mode can also be cancelled through further actuation of the down actuator. If pin DOWN goes to a high state when pin OUT is high, ASIC $\mu$1 resets and pulls pin OUT low. Pin OUT will remain in a low state even though pin DOWN aremains high. Similarly, actuation of the express down actuator a second time also effects cancellation of the down mode. If after a down cancel as described above, pin DOWN is maintained in a high state, ASIC $\mu$1 resets and pulls pin OUT low. Pin OUT remains low even though pin DOWN is high.

If the up switch S2 is actuated during an express down mode of ASIC $\mu$1, when pin OUT is high, the ASIC will be left without ground and shut off When ground is restored, all of the circuit's internal counters and registers must be reset, pulling pin OUT to a low state. If a short circuit current is detected during an express down mode, i.e. if $V_S=0.263$ V corresponding to $I_{SC}=45$ A in the presently preferred embodiment, pin OUT will be immediately pulled to a low state.

Thus, the present circuit allows for effective interruption of applied electrical power to a motor in an express down mode. FIG. 1A shows one possible embodiment of the motor M1 mechanically connected to the vehicle window 12 to be controlled. Additional details concerning the components of ASIC μ1 is included as FIG. 2. As shown in the functional block diagram included as FIG. 3, ASIC μ1 includes 9 main functional subcircuits, including amplifier, peak detector, buffer, short circuit comparator, stall comparator, state machines and output driver subcircuits. These subcircuits operate in accordance with the method described above in conjunction with FIG. 1.

The foregoing discloses and describes merely an exemplary embodiment of the present invention. One having skill in the art will readily recognize that various changes and modifications can be made thereto without departure from the spirit and scope of the present invention as set forth in the following claims.

We claim:

1. A method of controlling the application of electrical power to an electric motor comprising the steps of:

providing a user actuable switch, the closing of said switch initiating a continued flow of electrical power from a power supply to said motor;

measuring the current level in said motor;

detecting a peak current level on said initiating of continued flow of electrical power;

setting a threshold as a percentage of said motor peak current level, wherein the percentage is a number less than or equal to one; and interupting said application of power to said motor when said measured current level exceeds said threshold.

2. The method of claim 1 further including the step of electrically connecting a resistor between said motor and said ground, said current being measured as a function of the voltage drop across said resistor.

3. The method of claim 1 wherein said percentage is approximately 87%.

4. The method of claim 1 wherein said peak current level is the motor in-rush current level or any peak in said current level occurring after said switch closes.

5. The method of claim 1 wherein said method is used to control a motor used to raise and lower a vehicle window and said method further includes mechanically coupling an output of said motor to said window.

6. The method of claim 1 further including the step of:

starting a timer with the closing of said switch; and interupting said application of power to said motor after the passing of a predetermined period of time.

7. The method of claim 5 further including the step of:

providing a second user actuable switch, said second switch causing the flow of electrical current from said power suplly to said motor only as long as said second switch remains closed.

8. The method of claim 7 wherein said first and second switches are actuable by a driver or passenger of said vehicle via depression of a single toggle actuator.

9. The method of claim 7 further including the step of providing a third user actuable switch, the closing of said third switch causing the flow of electrical current from said power supply to said motor only as long as said third switch remains closed, the closing of said third switch causing said motor to move said window in a direction opposite to that caused by the closing of said first and second switches.

10. A circuit for selectively enabling and disabling the flow of electrical power from a power supply to an electric motor, said circuit comprising:

a user actuable switch for initiating a continuous flow of electrical power to said motor;

a current sensor for providing a signal indicative of a measured level of current in said motor;

a processor adapted to receive said current level signal from said sensor, said processor being programmed to identify a motor in-rush current level and to set a threshold value as a percentage of said in-rush current level wherein the percentage is a number less than or equal to one; and circuit means responsive to said processor for interrupting said flow of electrical power to said motor when said measured motor current level exceeds said threshold value.

11. The circuit of claim 10 wherein said processor includes an application specific integrated circuit.

12. The method of claim 10 wherein said current sensor includes a resistor connected between said motor and ground, and wherein said current is measured as a function of the voltage drop across said resistor.

13. The circuit of claim 10 wherein said circuit means for interrupting includes a relay.

14. The circuit of claim 10 wherein said circuit is installed in a vehicle for controlling a motor mechanically coupled to a window of said vehicle so as to effect movement of said window upon application of said electrical current.

* * * * *

UNITED STATES PATENT AND TRADEMARK OFFICE
CERTIFICATE OF CORRECTION

PATENT NO. : 5,867,357
DATED : February 2, 1999
INVENTOR(S) : Ignacio Michel et al.

It is certified that error appears in the above-identified patent and that said Letters Patent is hereby corrected as shown below:

On the title page, item [57]:

In the abstract, at line 2, delete "interprets", and insert therefor --interrupts--.

<u>In the claims</u>

2. The method of claim 1 further including the step of electrically connecting a resistor between said motor and [said] <u>a</u> ground, said current being measured as a function of the voltage drop across said resistor.

12. The [method] <u>circuit</u> of claim 10 wherein said current sensor includes a resistor connected between said motor and ground, and wherein said current is measured as a function of the voltage drop across said resistor.

Signed and Sealed this

Sixth Day of July, 1999

Attest:

Q. TODD DICKINSON

*Attesting Officer*   *Acting Commissioner of Patents and Trademarks*